Dec. 30, 1952  H. V. TIMMINS  2,623,343
POWER LAWN MOWER
Filed Dec. 24, 1949  2 SHEETS—SHEET 1

Inventor
Harold V. Timmins
Barthel & Bugbee
Attorneys

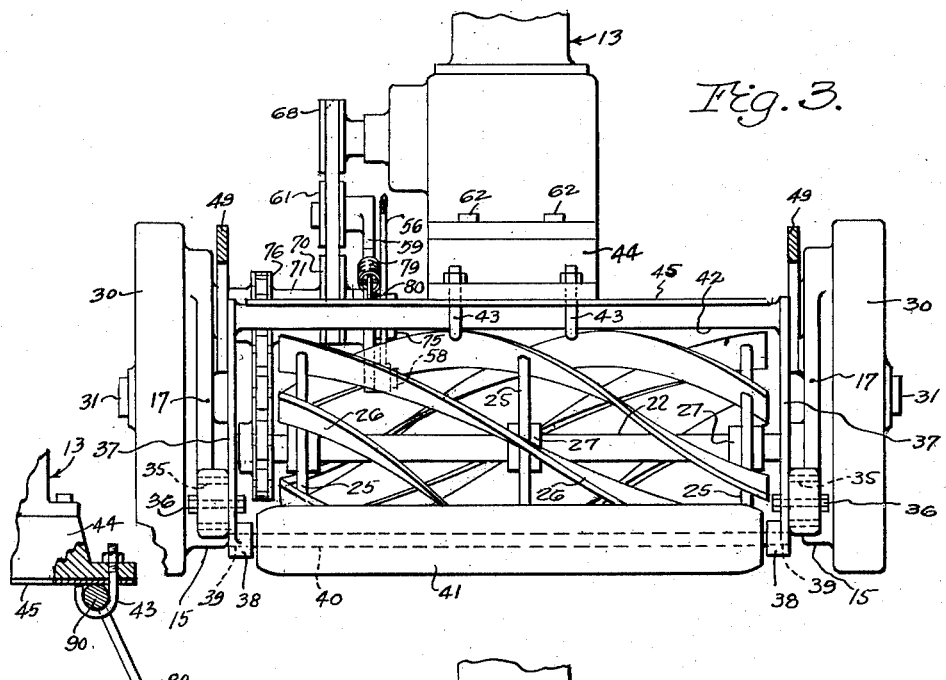
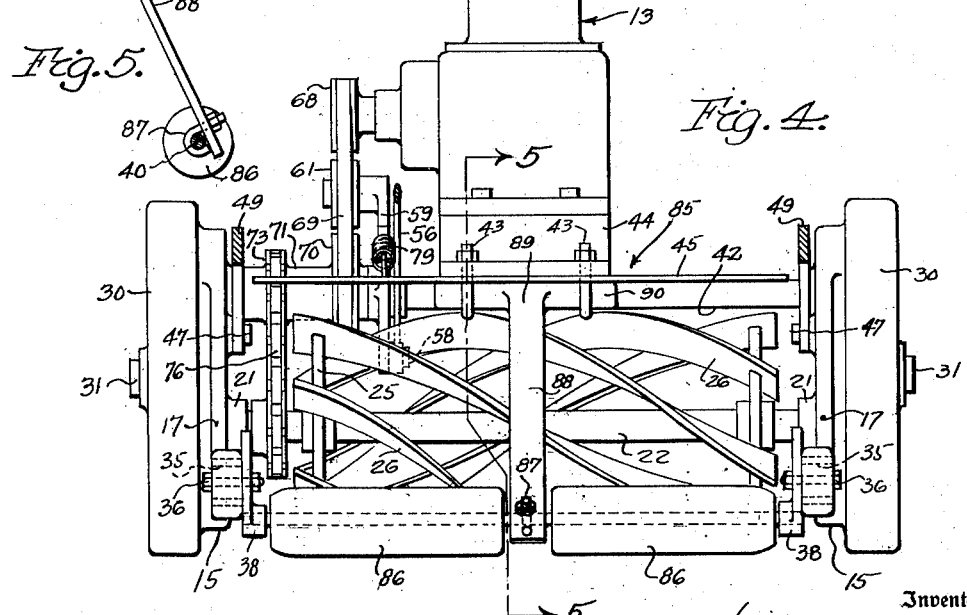

Patented Dec. 30, 1952

2,623,343

UNITED STATES PATENT OFFICE 2,623,343

POWER LAWN MOWER

Harold V. Timmins, Detroit, Mich., assignor to The Moto-Mower Company, Detroit, Mich., a corporation of Michigan Application December 24, 1949, Serial No. 134,909

2 Claims. (Cl. 56—26)

This invention relates to lawnmowers and, in particular, to power lawnmowers.

One object of this invention is to provide a lawnmower having a chassis which, with but slight modifications in the length of the cutting reel, may be used interchangeably for the manufacture of hand lawnmowers or power lawnmowers.

Another object is to provide a lawnmower wherein the chassis is so constructed that the front tie rod serves not only its normal function of strengthening the frame but also as a support for a pulley and drive sprocket by which the lawnmower chassis may be completed as a power lawnmower by adding an engine and a cutting reel having a drive sprocket.

Another object is to provide a lawnmower of the foregoing character which is adapted to employ an engine of any one of several different makes, the driving arrangement being sufficiently flexible to be driven by such engines without requiring alterations in the engines themselves.

Another object is to provide a lawnmower of the foregoing character having a simple and effective engine mounting and height adjustment by which the height of the cutter bar above the ground may be regulated quickly and easily without disturbing the level position of the engine.

In the manufacture of lawnmowers as hitherto conducted, one of the factors resulting in an increased cost of manufacture has been the necessity of providing a special chassis for the power lawnmower which differed in construction from that used for hand lawnmowers, so that the power lawnmower manufacturer could not obtain the benefit of the low cost of manufacture resulting from the mass production methods and enormous quantities of units produced in hand lawnmower manufacture. The present invention provides a lawnmower chassis which can be used either for a hand lawnmower or for a power lawnmower without requiring any great modifications.

In the drawings:

Figure 3 is a rear elevation of the lower lawnmower shown in Figures 1 and 2 but having six blades;

Figure 4 is a rear elevation of a modified power lawnmower having six blades and;

Figure 5 is a vertical section taken along the line 5—5 in Figure 4.

Figures 1, 2:
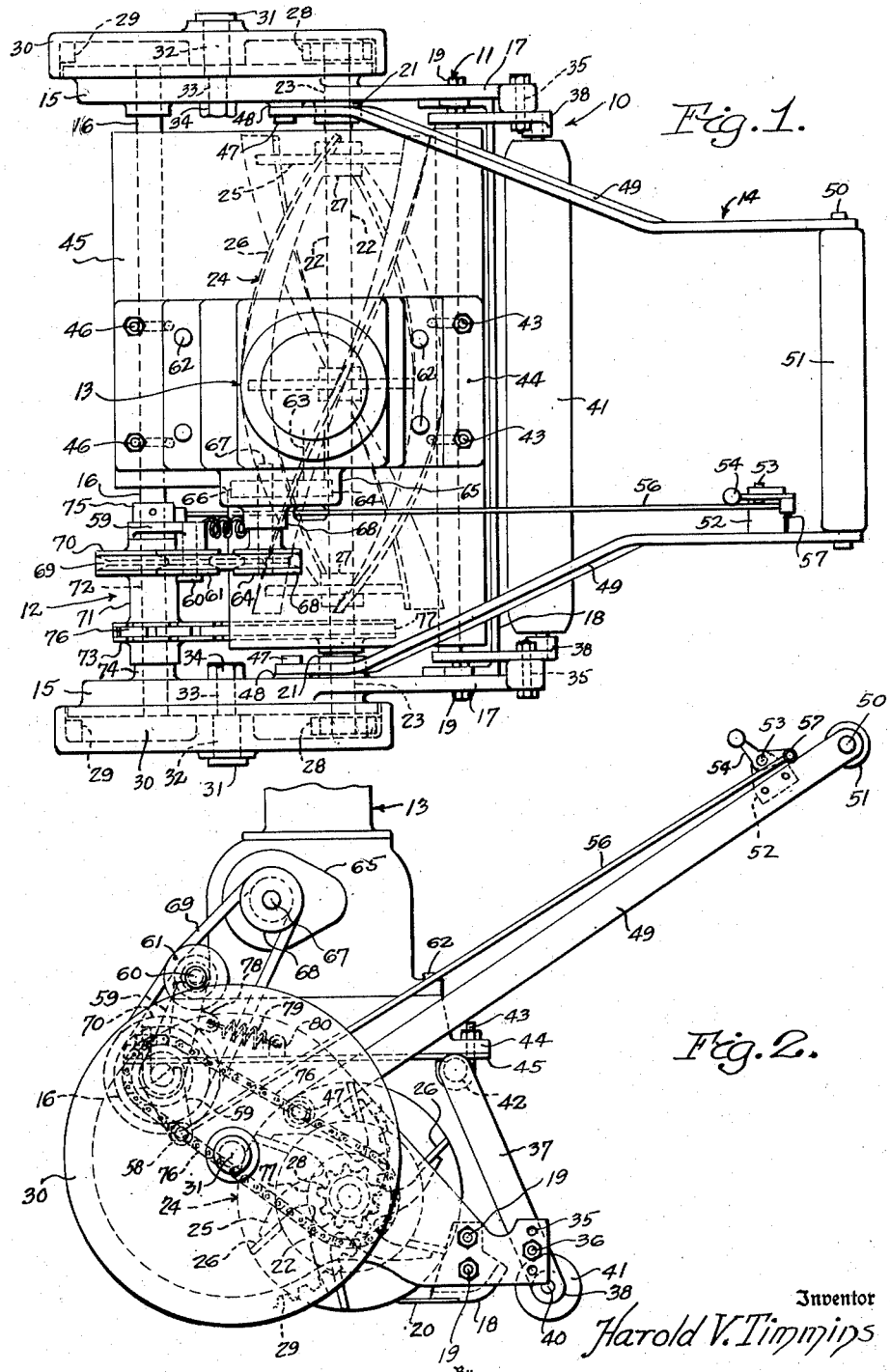
Figure 1 is a top plan view of one form of power lawnmower employing the convertible chassis of the present invention, as employable for either a hand lawnmower or a power lawnmower.
Figure 2 is a side elevation of the power lawnmower shown in Figure 1 but having six blades.

Referring to the drawings in detail, Figure 1 shows a power lawnmower, generally designated 10, as consisting generally of a convertible chassis 11 having an attachable driving mechanism 12 by which it may be driven from an internal combustion engine 13. The chassis 11 is pushed and guided by a handle assembly, generally designated 14.

The chassis 11, which is usable either for a hand lawnmower or a power lawnmower, consists of laterally spaced side frames 15 interconnected by a tie rod 16 at the upper forward end thereof and having rearwardly and downwardly extending arms 17 between which a cutter bar 18 is bolted as at 19, the cutter bar carrying a fixed cutting blade 20. The cutter bar 18 thus serves not only as a blade support but also as a rearward tie member for the guide frames 15. Journaled in the inwardly extending bosses 21 of the side frames 15 is a cutting reel shaft 22 (Figures 1 and 3) rotatably supported in bores 23 therein and carrying a cutting reel, generally designated 24, consisting of spaced spiders 25 carrying spiral cutting blades 26 on their outer ends, the spiders 25 having hubs 27 mounted on the cutting reel shaft 22. The fixed cutting blade 20 and cutting reel 24 are positioned adjacent one another so that the cutting edges of the spiral cutting blades 26 move across the cutting edge of the fixed cutting blade 20 as the cutting reel 24 is rotated.

Mounted on the outer ends of the cutting reel shaft 20 are pinions 28 meshing with internal gears 29 integral with ground wheels 30. The ground wheels 30 are rotatably mounted upon studs 31 passing through bores 32 and 33 in the ground wheels 29 and side plates 15 respectively and held in position by nuts 34 threaded on the inner ends of the studs 31. The side frame arms 17 at their rearward ends are provided with rows of vertically spaced bolt holes 35. A bolt 36 passes through one of each set of bolt holes 35 and through a ground roller supporting arm 37. The ground roller supporting arms 37 at their lower ends are provided with bosses 38 bored as at 39 to receive the opposite ends of a ground roller shaft 40 carrying a ground roller 41. The upper ends of the ground roller supporting arms 37 are secured, as by welding, to a cross rod 42 which in turn is secured by J-bolts 43 to the rearward end of an engine platform 44. The J-bolts 43 pass through a cover plate 45 of sheet metal interposed between the cross rod 42 and the platform 44. The forward end of the engine platform 44 is secured by J-bolts 46 to the tie rod 16, the J-bolts 46 also passing through the cover plate 45 (Figure 1).

Extending inwardly from the side frames 15 are pivot pins or studs 47 mounted in bosses 48 and carrying the suitably bored lower ends of side bars 49 of the handle unit 14. The side bars 49 are bent inward to converge toward one another although having parallel inner and outer end portions (Figure 1) and at their outer ends are interconnected by a handle rod 50 upon which is mounted a handle 51 of wood or other suitable material. The handle rod 50 is preferably upset at its opposite ends to retain it in position. A bracket 52 is riveted or otherwise secured to one of the handle unit side bars 49 and carries a pivot bolt or stud 53 upon which is mounted the clutch lever 54 by which the driving connection between the engine 13 and the cutting reel 24 is made or broken, as desired. For this purpose, a control rod 56 is pivotally connected as at 57 to the clutch control lever 54 and extends downward to a pivotal connection 58 with the lower end of a clutch lever 59, the midportion of which is pivotally mounted on the tie rod 16 and the upper portion of which carries a stud 60 upon which a contact pulley 61 is rotatably mounted.

The engine 55 is bolted as at 62 to the engine platform 44 and is of any suitable conventional type. The details of the engine 13 are beyond the scope of the present invention except that it is provided with the usual crankshaft or output shaft 63 (Figure 1) carrying a pinion 64 mounted in a reduction gear case 65. The pinion 64 meshes with a gear 66 likewise mounted within the reduction gear case 65 upon a shaft 67. The outer end of the shaft 67 is journaled in a boss 68 which projects laterally from the gear case 65. Mounted on the outer end of the shaft 67 is a drive pulley 68 around which passes an endless belt 69, preferably a V-belt. The belt 69 also passes over the periphery of the pulley 61 and around a driven pulley 70 having an elongated hub 71 bored as at 72 to rotate loosely upon the tie rod 16. The hub 71 also carries a sprocket 73 and projects beyond it (Figure 1) to engage a boss 74 extending inward from the adjacent side frame 15. A retaining collar 75 is pinned or otherwise suitably secured to the tie rod 16 on the opposite side of the clutch lever 59 from the pulley 70 and holds these parts in assembly. An endless sprocket chain 76 meshes with the sprocket 73 and transmits the drive from it to a sprocket 77 mounted on the cutting reel shaft 22. An ear 78 extends rearwardly from the upper arm of the clutch lever 59 and carries the forward end of a tension spring 79, the rearward end of which is anchored to an ear 80 which is secured to and extends upward from the cover plate 45.

*Modified lawnmower*

The lawnmower, generally designatde 85, shown in Figures 4 and 5 is generally similar in most respects to the lawnmower 10 of Figures 1 to 4 inclusive and similar parts are designated with the same numerals. In Figure 4, however, the roller supporting arms 37 terminate shortly above the extension arms 17 of the side frames 15. Moreover, the single ground roller 41 of Figure 2 is replaced by a pair of axially spaced ground rollers 86. Connected as by a J-bolt 87 to the roller shaft 40 in the space between the ground rollers 86 is the lower end of the upright 88 of a T-member 89, the cross member 90 of which is secured by the J-bolts 43 to the engine platform 44 and cover plate 45. The cross member 90 is of circular cross-section (Figure 5) so as to pivot momentarily in the J-bolts 43 when the latter are loosened. The T-member 89 furnishes a simplified yet strong connection between the engine platform 44 and the ground roller shaft 40.

*Operation*

In the assembly of the mower 10 as a hand mower, the engine platform 44, cover plate 45 and engine 13 are, of course, omitted, together with the driving mechanism 12, and the tie rod 16 is thus completely unencumbered. The clutch control lever 54 and bracket 52 are also omitted from the handle side bar 49, and the sprocket 77 is likewise omitted from the ground reel shaft 22. The pinions 28, which in both the hand and power lawnmowers are of the conventional unidirectional type, are reversed in the hand lawnmower so that the ground wheels 30 drive the cutting reel shaft 22, whereas in the power lawnmower, the cutting reel shaft drives the ground wheels 30. Moreover, in large scale production of the hand lawnmower, a longer cutting reel 24 would customarily be used, since the space at its left-hand end is no longer needed for the sprocket 77 and sprocket chain 76. Thus, with practically no modifications, the chassis 11 of Figure 1 can be used either for a hand lawnmower or for a power lawnmower.

In operation, the hand lawnmower is used in the same manner as any hand lawnmower. The lower lawnmower made on the same chassis is operated by starting the motor 13 and then shifting the clutch control lever 54 to swing the clutch lever 59 and the pulley 61 into contact with the V-belt 69 so as to take up the slack in this belt. When the slack is taken up in this manner, power is transmitted to the pulley 70, rotating the hub 71 and sprocket 73, this rotation being transmitted by the sprocket chain 76 to the sprocket 77 on the reel shaft 22. The consequent rotation of the reel shaft 22 transmits power through the pinions 28 to the internal gears 29 on the ground wheels 30, causing them to rotate and propel the mower while the operator guides it by grasping the handle 51 and swinging it to and fro to steer it. To halt the mower at any time, the operator merely grasps the clutch control lever 54 and swings its upper arm toward him, thereby swinging the pulley 61 away from the belt 69; the slackness which immediately develops in this belt instantly interrupts the drive to the pulley 70, and the lawnmower halts.

In either the power lawnmower or the hand mower, the position of the cutting blade 20 relatively to the ground can quickly and easily be adjusted merely by removing the bolts 36 and replacing them in other holes 35 in the side frame extension arms 17. This change of height in the cutting blade 20 does not affect the level of the engine platform 44 or engine 13 to any appreciable extent, as the arms 37 (Figure 2) or the upright 88 of the T-member 89 swing through a negligible angle in making this adjustment.

What I claim is:

1. In combination with a lawnmower having a pair of transversely-spaced side frames with upper edges sloping downwardly from front to rear thereof and having a transverse front tie rod interconnecting the forward portions of said side frames and a rotary cutting reel journaled at its opposite ends in said side frames, an engine having a base with its forward portion supported by said tie rod and having a drive wheel, a driven wheel rotatably mounted on said tie rod and drivingly connected to said driving wheel, a drive sprocket rotatably mounted on said tie rod and drivingly connected to said driven wheel, a driven sprocket drivingly connected to said cutting reel, and a sprocket chain drivingly interconnecting said sprockets.

2. In combination with a lawnmower having a pair of transversely-spaced side frames with upper edges sloping downwardly from front to rear thereof and having a transverse front tie rod interconnecting the forward portions of said side frames and rotary cutting reel journaled at its opposite ends in said side frames, an engine having a base with its forward portion supported by said tie rod and having a drivewheel, a driven wheel rotatably mounted on said tie rod and drivingly connected to said driving wheel, a drive sprocket rotatably mounted on said tie rod and drivingly connected to said driven wheel, a driven sprocket drivingly connected to said cutting reel, a sprocket chain drivingly interconnecting said sprockets, an endless flexible member drivingly interconnecting said wheels, a clutch arm swingably mounted on said tie rod, an idler wheel rotatably mounted on said arm and swingable into engagement with said endless flexible member, and mechanism for urging said idler wheel into engagement with said endless flexible member.

HAROLD V. TIMMINS.

REFERENCES CITED

The following references are of record in the file of this patent:

UNITED STATES PATENTS

| Number | Name | Date |
|---|---|---|
| 2,088,293 | Funk | July 27, 1937 |
| 2,250,418 | Funk | July 22, 1941 |
| 2,468,839 | Rodesci | May 3, 1949 |
| 2,519,039 | George et al. | Aug. 15, 1950 |